United States Patent Office 2,971,854
Patented Feb. 14, 1961

2,971,854
OPTICAL GLASS

Walter Geffcken, Mainz, Germany, assignor to Jenaer Glaswerk Schott & Gen., Mainz, Germany, a German corporation No Drawing. Filed May 23, 1958, Ser. No. 737,220

Claims priority, application Germany May 23, 1957

13 Claims. (Cl. 106—54)

The present invention relates to optical glass which primarily consists of $La_2O_3$, $ThO_2$, $B_2O_3$, CdO, $Ta_2O_5$, $ZrO_2$, $WO_3$, alkaline earths, ZnO, and $SiO_2$, and has a very high refractory index as well as a very high $\nu$-value.

Similar glass known prior to this invention had, for example, the following composition:

|  | Percent | |
|---|---|---|
| $La_2O_3$ | 19.5 | 21.4 |
| $ThO_2$ | 18.0 | 18.5 |
| $ZrO_2$ | 8.0 | |
| CdO | 19.5 | 20.8 |
| BaO | 10.0 | 10.6 |
| $B_2O_3$ | 14.0 | 17.0 |
| $SiO_2$ | 11.0 | 11.7 |

Such glass had a refractory index of 1.785 or 1.762 at a $\nu$-value of 46.0 or 48.0, respectively. Considering its excellent optical properties, such glass contained a relatively small amount of valuable raw materials. However, it had the disadvantage that it was very difficult to melt larger batches of this glass because of its inclination to crystallize.

According to the present invention, it has now been found that the danger of crystallization may be avoided, and that the optical properties of the glass may be even further improved by reducing the content of the mentioned bivalent oxides below the former minimum limit of 28%, and by making it between 10 to 18% by weight, of which a maximum of 7% should be taken up by the group of alkaline earths, while the remainder should consist of ZnO and CdO. The upper limit of $La_2O_3$ and $ThO_2$ should then be increased accordingly. The $SiO_2$ content should also be decreased and should not exceed 6%, and in its stead the upper limit of the boric acid content should be increased to 30% by weight.

The glass according to the present invention is preferably divided into two groups, one of which has a refractory index between 1.770 and 1.805, while the other has a refractory index above 1.805.

The compositions of these two groups of glass are, according to the invention, as follows:

TABLE 1

|  | 1. $nd=1.770$–$1.805$ | 2. $nd \geq 1.805$ |
|---|---|---|
|  | Percent | Percent |
| $La_2O_3$ | 24 to 33 | 24 to 33. |
| $ThO_2$ | 16.5 to 25.5 | 16.5 to 25.5. |
| $B_2O_3+SiO_2$ | 23.5 to 30 | 19.5 to 30. |
| $SiO_2$ | <6 | <6. |
| Bivalent oxides | 10 to 18 | 10 to 18. |
| $CaO+SrO+BaO$ | <7 | <5. |
| $CdO+ZnO$ | 3 to 15 | 9.5 to 15. |
| ZnO | 3 to 10 | 0 to 10. |
| $Ta_2O_5$ | 0 to 8 | 5 to 13. |
| $WO_3$ |  | 1 to 10. |
| $WO_3+Ta_2O_5$ |  | 15. |

The glass in group $nd>1.805$ has a certain similarity to the glass described in the published German patent application No. 1,003,410 (inventor De Paolis) which defines a glass having an $nd$-value of 1.82 to 1.89. However, the glass according to the invention differs from the glass in the mentioned patent application by its lower content in the very costly tantalum oxide which is necessary therein for the purpose of stabilization if the bivalent material consists of BaO. However, particularly in a glass with an $nd$-value of more than 1.82, a higher content in $Ta_2O_5$ has a very unfavorable effect since it reduces the $\nu$-value.

In the glass according to the present invention, the stabilization will be attained by means of the relatively high content in ZnO+CdO in the presence of substantially equal constituents in $ThO_2$ and $La_2O_3$. The above-mentioned upper limit of the $Ta_2O_5$ content will not even be required if the ZnO and CdO content is suitably selected. Also for reasons of economy, the amount of $Ta_2O_5$ applied will usually be made in the vicinity of the mentioned lower limit so that the content in tantalum oxide in the group with an $nd$-value of 1.77 to 1.805 will be below 3.5%, while in the group with an $nd$-value of more than 1.805 it is preferably made less than 10%. The contents in ZnO and CdO should then amount to at least 5% and 9.5%, respectively, while the content in alkaline earths should be less than 6%.

Thus, the following table of components will result:

TABLE 2

|  | 1. $nd=1.77$ to $1.805$ | 2. $nd=1.805$ |
|---|---|---|
|  | Percent | Percent |
| $La_2O_3$ | 24 to 33 | 24 to 33. |
| $ThO_2$ | 16.5 to 25.5 | 16.5 to 25. |
| $B_2O_3+SiO_2$ | 23.5 to 30 | 19.5 to 30. |
| $SiO_2$ | <6 | <6. |
| Bivalent oxides | 10 to 18 | 10 to 18. |
| $CaO+SrO+BaO$ | <6 | <5. |
| $CdO+ZnO$ | 5 to 15 | 9.5 to 15. |
| ZnO | 3 to 10 | 0 to 10. |
| $Ta_2O_5$ | 0 to 3.5 | 5 to 10. |
| $WO_3$ |  | 1 to 10. |

An addition of $WO_3$ also favorably affects the stability of the glass if it belongs to one of the groups with a lower refractory index, although it is advisable to keep it at an amount of less than 1.5% so as not to reduce the $\nu$-value. Also, in all cases it is possible to provide an addition of $ZrO_2$ at an amount of up to 6%. As usual, the $WO_3$ content may be partly replaced by $MO_3$, and also the $Ta_2O_5$ content by $Nb_2O_5$.

In the group with the lower refractory index, the CdO-content should preferably not exceed 5%, while in the group with the higher refractory index, the ZnO-content should not be reduced to less than 3% if a very high $\nu$ should be desired. Also an addition of $Li_2O$ of up to 1% may be provided.

If maximum $\nu$-values are to be attained, it is advisable not to reduce the sum of $La_2O_3+ThO_2$ to less than 49%.

The production of the glass according to the present invention is carried out in the usual manner in a platinum crucible. $La_2O_3$, $SiO_2$, CdO, ZnO, $ZrO_2$, $Ta_2O_5$, and $WO_3$ are preferably added to the mixture in the form of oxides, while BaO, SrO, and $ThO_2$ are added in the form of nitrates and CaO in the form of a carbonate. The glass mixture melts very easily, and it is therefore not necessary to increase the melting temperature above 1350°. The purification may already be carried out very completely at a temperature of less than 1300° at a period of approximately one hour, while the purifying agent may consist of $As_2O_3$ or $Sb_2O_3$ at an amount of no more than 0.5%. The glass composition is preferably stirred as usual until it has a syrupy consistency, which occurs at a temperature of approximately 950°, whereupon the glass is poured as usual into a preheated iron mold in which it is made stain-free by slow cooling in a cooling oven. Even large batches of this glass may be melted without crystallization. The glass finally attained is practically colorless, provided the purest kind of raw materials have been used.

The following compositions according to the invention excel by unusually favorable optical properties at an extremely low content in the costly tantalum oxide.

|  | Percent | |
|---|---|---|
| $La_2O_3$ | 27 to 29 | 27 to 29. |
| $ThO_2$ | 20 to 23 | 20 to 23. |
| $B_2O_3$ | 27 to 30 | 23.5 to 27. |
| $BaO+SrO+CaO$ | 4 to 6 | 4 to 6. |
| $ZnO$ | 4 to 6.5 | 4 to 6.5. |
| $ZnO+CdO$ | 8 to 10 | 10 to 15. |
| $WO_3$ | 0.5 to 1.5 | 0.5 to 1.5. |
| $Ta_2O_5$ | 0 to 2 | 2 to 3.5. |
| $ZrO_2$ | 3 to 5 | |

TABLE 3

| No | 1 | 2 | 3 | 4 | 5 | 6 | 7 |
|---|---|---|---|---|---|---|---|
| $B_2O_3$ | 29.1 | 29.1 | 27.3 | 27.2 | 27.2 | 27.2 | 27.8 |
| $La_2O_3$ | 27.2 | 27.2 | 27.8 | 27.7 | 27.7 | 27.7 | 28.3 |
| $ThO_2$ | 21.1 | 23.0 | 25.3 | 21.3 | 23.3 | 21.3 | 21.7 |
| $ZnO$ | 6.3 | 6.3 | 6.4 | 8.4 | 6.4 | 6.4 | 6.6 |
| $CdO$ | 3.9 | 1.9 |  | 1.5 | 3.5 | 3.5 |  |
| $BaO$ | 3.7 | 3.7 | 4.8 | 3.8 | 3.8 | 3.8 | 3.8 |
| $WO_3$ | 2.9 | 2.9 | 0.5 | 1.2 | 1.2 | 1.2 | 1.2 |
| $Ta_2O_5$ |  |  | 7.9 | 4.9 | 1.0 | 3.0 | 5.1 |
| $Li_2O$ |  |  |  |  |  |  |  |
| $CaO$ | 0.9 | 1.0 |  | 1.0 | 1.0 | 1.0 | 1.0 |
| $ZrO_2$ | 4.9 | 4.9 |  | 3.0 | 5.0 | 5.0 | 4.5 |
| $nd$ | 1.769 | 1.768 | 1.782 | 1.784 | 1.785 | 1.786 | 1.784 |
| $\nu$ | 48.3 | 48.7 | 47.5 | 47.3 | 47.7 | 47.2 | 46.9 |

| No | 8 | 9 | 10 | 11 | 12 | 13 | 14 |
|---|---|---|---|---|---|---|---|
| $B_2O_3$ | 27.2 | 27.3 | 24.8 | 25.0 | 24.8 | 23.3 | 21.3 |
| $La_2O_3$ | 27.7 | 27.8 | 27.7 | 28.0 | 27.7 | 30.7 | 27.7 |
| $ThO_2$ | 21.3 | 21.3 | 21.3 | 21.5 | 21.3 | 18.3 | 21.3 |
| $ZnO$ | 6.4 | 6.4 | 6.4 | 4.5 | 4.4 | 4.4 | 4.9 |
| $CdO$ | 3.5 | 4.0 | 5.9 | 8.0 | 7.9 | 5.4 | 5.4 |
| $BaO$ | 3.8 | 4.8 | 3.8 | 3.8 | 3.8 | 3.7 | 3.8 |
| $WO_3$ | 1.2 | 0.5 | 1.2 | 1.2 | 1.2 | 1.2 | 1.2 |
| $Ta_2O_5$ | 4.9 | 7.9 | 7.9 | 5.0 | 7.9 | 12.4 | 12.4 |
| $Li_2O$ |  |  |  |  |  | 1.0 |  |
| $CaO$ | 1.0 |  | 1.0 | 1.0 | 1.0 |  |  |
| $ZrO_2$ | 3.0 |  |  | 3.0 |  |  | 2.0 |
| $nd$ | 1.784 | 1.782 | 1.796 | 1.796 | 1.799 | 1.806 | 1.824 |
| $\nu$ | 47.1 | 47.4 | 46.0 | 46.0 | 46.2 | 45.3 | 43.4 |

| No | 15 | 16 | 17 | 18 | 19 | 20 |
|---|---|---|---|---|---|---|
| $B_2O_3$ | 21.5 | 21.5 | 19.6 | 23.5 | 23.5 | 25.0 |
| $La_2O_3$ | 33.0 | 28.0 | 27.4 | 28.0 | 24.0 | 28.0 |
| $ThO_2$ | 16.5 | 21.5 | 21.2 | 25.5 | 25.5 | 21.5 |
| $ZnO$ | 6.5 | 6.5 | 6.4 | 5.0 | 5.0 | 7.0 |
| $CdO$ | 8.5 | 8.5 | 8.3 | 5.0 | 5.0 | 8.0 |
| $BaO$ | 1.5 | 1.5 | 1.5 |  | 1.0 | 2.0 |
| $WO_3$ | 1.0 | 6.0 | 6.8 | 3.0 | 3.0 | 1.2 |
| $Ta_2O_5$ | 10.0 | 5.0 | 6.8 | 10.0 | 10.0 | 5.5 |
| $Li_2O$ |  |  |  |  |  |  |
| $CaO$ |  |  |  |  |  |  |
| $ZrO_2$ | 1.5 | 1.5 | 2.0 |  | 3.0 | 1.8 |
| $nd$ |  |  |  | 1.805 |  |  |
| $\nu$ |  |  |  | 45.0 |  |  |

Although my invention has been illustrated and described with reference to the preferred embodiments thereof, I wish to have it understood that it is in no way limited to the details of such embodiments or to the specific examples described, but is capable of numerous modifications within the scope of the appended claims.

Having thus fully disclosed my invention, what I claim is:

1. An optical glass having an index of refraction of at least 1.77 and consisting essentially of the following composition:

| | Percent |
|---|---|
| $La_2O_3$ | 24 to 33 |
| $ThO_2$ | 16.5 to 25.5 |
| $B_2O_3+SiO_2$ | 19.5 to 30, in which |
| $SiO_2$ | <6 |
| Bivalent oxides | 10 to 18, in which |
| $CaO+SrO+BaO$ | <7 |
| $CdO+ZnO$ | 3 to 15, in which |
| $ZnO$ | 0 to 10 |
| $Ta_2O_5$ | 0 to 13 |
| $WO_3$ | 0 to 10, in which |
| $Ta_2O_5+WO_3$ | <15 |

2. An optical glass as defined in claim 1 having a refractory index of 1.77 to 1.805 and consisting essentially of the following composition:

| | Percent |
|---|---|
| $La_2O_3$ | 24 to 33 |
| $ThO_2$ | 16.5 to 25.5 |
| $B_2O_3+SiO_2$ | 23.5 to 30 |
| $SiO_2$ | <6 |
| Bivalent oxides | 10 to 18 |
| $CaO+SrO+BaO$ | <7 |
| $CdO+ZnO$ | 3 to 15 |
| $ZnO$ | 3 to 10 |
| $Ta_2O_5$ | 0 to 8 |

3. An optical glass as defined in claim 1, having a refractory index of $nd \geq 1.805$ and consisting essentially of the following composition:

| | Percent |
|---|---|
| $La_2O_3$ | 24 to 33 |
| $ThO_2$ | 16.5 to 25.5 |
| $B_2O_3+SiO_2$ | 19.5 to 30 |
| $SiO_2$ | <6 |
| Bivalent oxides | 10 to 18 |
| $CaO+SrO+BaO$ | <5 |
| $CdO+ZnO$ | 9.5 to 15 |
| $ZnO$ | 0 to 10 |
| $Ta_2O_5$ | 5 to 13 |
| $WO_3$ | 1 to 10 |
| $WO_3+Ta_2O_5$ | <15 |

4. An optical glass as defined in claim 2 having a refractory index of $nd = 1.77$ to 1.805 and consisting essentially of the following composition:

| | Percent |
|---|---|
| $La_2O_3$ | 24 to 33 |
| $ThO_2$ | 16.5 to 25.5 |
| $B_2O_3+SiO_2$ | 23.5 to 30 |
| $SiO_2$ | <6 |
| Bivalent oxides | 10 to 18 |
| $CaO+SrO+BaO$ | <6 |
| $CdO+ZnO$ | 5 to 15 |
| $ZnO$ | 3 to 10 |
| $Ta_2O_5$ | 0 to 3.5 |

5. An optical glass as defined in claim 3 having a refractory index of $nd \geq 1.805$ and consisting essentially of the following composition:

| | Percent |
|---|---|
| $La_2O_3$ | 24 to 33 |
| $ThO_2$ | 16.5 to 25.5 |
| $B_2O_3+SiO_2$ | 19.5 to 30 |
| $SiO_2$ | <6 |
| Bivalent oxides | 10 to 18 |
| $CaO+SrO+BaO$ | <5 |
| $CdO+ZnO$ | 9.5 to 15 |
| $ZnO$ | 0 to 10 |
| $Ta_2O_5$ | 5 to 10 |
| $WO_3$ | 1 to 10 |

6. An optical glass as defined in claim 4, having a content in $WO_3$ up to 1.5%.

7. An optical glass as defined in claim 6, having a content in $ZrO_2$ up to 6%.

8. An optical glass as defined in claim 4, having a content in CdO of less than 5%.

9. An optical glass as defined in claim 5, having a content in ZnO of at least 3%.

10. An optical glass as defined in claim 9, wherein the sum of $La_2O_3+ThO_2$ amounts to at least 49%.

11. An optical glass as defined in claim 7, consisting essentially of the following composition:

| | Percent |
|---|---|
| $La_2O_3$ | 27 to 29 |
| $ThO_2$ | 20 to 23 |
| $B_2O_3$ | 27 to 30 |
| $BaO+SrO+CaO$ | 4 to 6 |
| $ZnO$ | 4 to 6.5 |
| $ZnO+CdO$ | 8 to 10 |
| $WO_3$ | 0.5 to 1.5 |
| $Ta_2O_5$ | 0 to 2 |
| $ZrO_2$ | 3 to 5 |

12. An optical glass as defined in claim 6 consisting essentially of the following composition:

| | Percent |
|---|---|
| $La_2O_3$ | 27 to 29 |
| $ThO_2$ | 20 to 23 |
| $B_2O_3$ | 23.5 to 27 |
| $BaO+SrO+CaO$ | 4 to 6 |
| $ZnO$ | 4 to 6.5 |
| $ZnO+CdO$ | 10 to 15 |
| $WO_3$ | 0.5 to 1.5 |
| $Ta_2O_5$ | 2 to 3.5 |

13. An optical glass having a refractory index of $nd=1.805$ and consisting essentially of the following composition:

| | Percent |
|---|---|
| $B_2O_3$ | 21.3 |
| $La_2O_3$ | 27.7 |
| $ThO_2$ | 21.3 |
| $ZnO$ | 4.9 |
| $CdO$ | 5.4 |
| $BaO$ | 3.8 |
| $WO_3$ | 1.2 |
| $Ta_2O_5$ | 12.4 |
| $ZrO_2$ | 2.0 |

References Cited in the file of this patent

UNITED STATES PATENTS

| 2,241,249 | Eberlin et al. | May 6, 1941 |
| 2,434,149 | De Paolis | Jan. 6, 1948 |
| 2,787,554 | De Paolis | Apr. 2, 1957 |

FOREIGN PATENTS

| 615,286 | Great Britain | Jan. 4, 1949 |